Nov. 21, 1967 I. O. FIELDGATE 3,353,733

PINCH ROLLER MECHANISM

Filed Dec. 28, 1964 3 Sheets-Sheet 1

INVENTOR
IVAN O. FIELDGATE
BY
Douglas M. Clarkson
ATTORNEY

INVENTOR
IVAN O. FIELDGATE
BY
Douglas M. Clarkson
ATTORNEY

Nov. 21, 1967 I. O. FIELDGATE 3,353,733

PINCH ROLLER MECHANISM

Filed Dec. 28, 1964 3 Sheets-Sheet 3

INVENTOR
IVAN O. FIELDGATE
BY
Douglas M. Clarkson
ATTORNEY 3,353,733
Patented Nov. 21, 1967

3,353,733

PINCH ROLLER MECHANISM

Ivan O. Fieldgate, Halesite, N.Y., assignor to Potter Instrument Company, Inc., Plainview, N.Y., a corporation of New York Filed Dec. 28, 1964, Ser. No. 421,383
2 Claims. (Cl. 226—176)

The invention, generally, relates to tape handler apparatus and, more particularly, to such apparatus including a new and improved tape drive mechanism.

In tape handler apparatus as used today, it is essential that the tape be movable, including starting and stopping, at extremely high speed. This requirement is due in part to recent advances in technology involving the electronics which permits reading and writing information on tapes at very high speeds.

Since it is now feasible to read and write information at very high speeds, it is necessary to be able to develop fast movement in the tape. However, it is extremely difficult to develop movement in tape which will keep pace with the electrical requirements of the system since any drive means for the tape is inherently of a mechanical nature involving such factors as inertia and delays in mechanical response to actuating signals.

Although several tape drive mechanisms have been developed in the past for moving tape through a tape handler, those drive mechanisms generally do not operate with the desired precision at high cyclic rates. A significant factor in the lack of precision in prior drive mechanisms accrues from bounce of the roller as it contacts the tape.

For example, a pinch roller mechanism is actuated to pince the tape between a roller and a continuously driven capstan for moving the tape in a desired forward or reverse direction. To stop the tape, the pinch rol er is disengaged from the drive capstan and is moved to a retracted position against positioning stops. However, prior drive mechanisms have been plagued with the pinch roller bouncing off of the tape and also off of the positioning stops resulting in undesirable intermittent tape motion and excessive tape wear.

It is, therefore, an object of the present invention to provide an improved tape handler apparatus which can be utilized at high operational command rates for controlling tape movement.

It is a further object of this invention to provide an improved tape drive mechanism which admits of operation at high command rates.

A still further object of this invention is to provide an improved pinch roller mechanism operab'e for precise control of tape movement at high operation rates.

Another object of the present invention is to provide an improved pinch roller mechanism with various independent adjustments, thereby permitting precise control over the operating characteristics of the mechanism.

Briefly, a pinch roller drive mechanism in accordance with the principles of this invention may be used either on a magnetic or a perforated tape handler apparatus. It is usual in such tape handler apparatus that a transducer be adapted to transfer coded information between information processing circuitry and an elongated moving web, such as a tape.

Such tape handler apparatus includes a drive capstan having a source of motive power to rotatably drive the capstan continuously. A pinch roller drive mechanism is supported in a predetermined spacial relationship with the drive capstan to pinch a tape against the drive capstan when movement of the tape is desired and to release the tape to permit stopping. The pinch roller mechanism, in accordance with the invention, includes a roller member formed of a predetermined material having frictional and resilient characteristics suitable for such a pinching function.

An actuator is provided in the pinch roller mechanism, which actuator may comprise an electromagnetic drive arrangement to advance the pinch roller into pinching (or "clamping") engagement, catching the tape between the the pinch roller and a continuously rotating drive capstan, thereby driving the tape in the direction of rotation of the drive capstan. Upon command to cease tape drive, the pinch roller is retracted clearing the tape and returning to a predetermined, retracted position determined by position stops, without bounce therefrom to improperly re-engage the tape drive.

A unique structural feature of the pinch roller mechanism of the invention is the separation of the suspension system from the return spring. Also, the suspension system for the pinch roller mechanism is constructed from inflexible components, so that the resonant frequency of the return spring may be raised beyond any frequency which may be excited by the system during operation. At the same time, stiffness of the system is achieved without pentalty of excessive inertia.

The unique structural arrangement also includes adjustment means for various operating characteristics.

The invention further resides in certain novel features of parts, and further objects and advantages thereof will become apparent to those skilled in the art to which it pertains from the following description of the presently preferred embodiment thereof described with respect to the accompanying drawings in which similar reference characters represent corresponding parts in the several views, in which.

Figure 1:
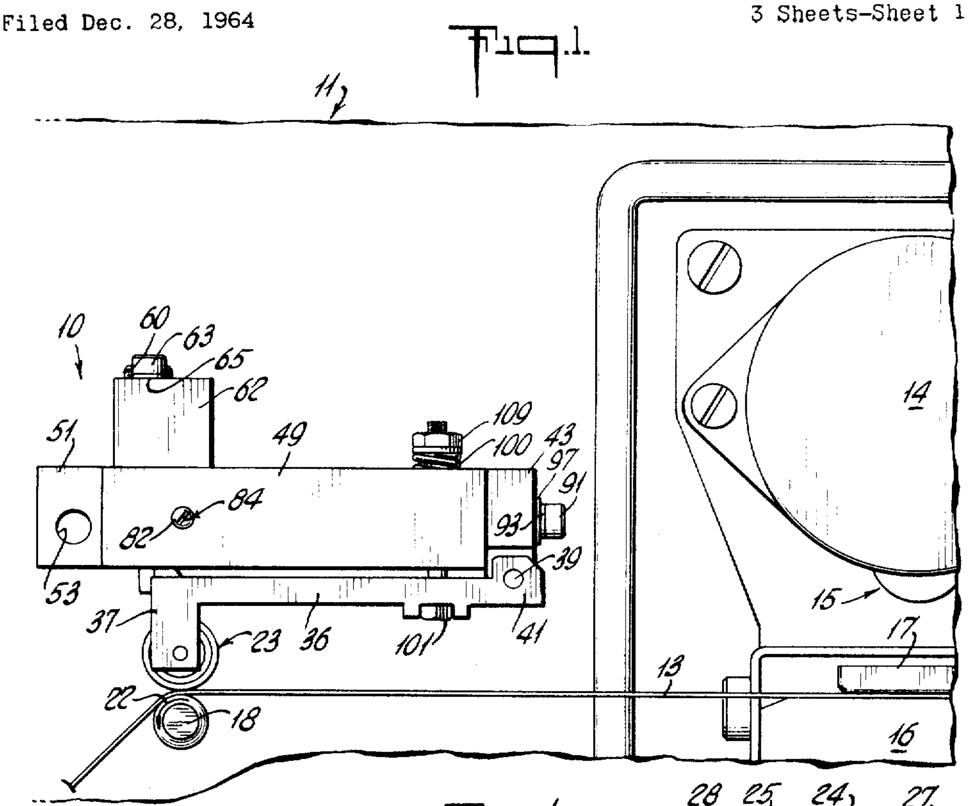
FIG. 1 is an elevation view of a tape handler including the pinch roller mechanism in accordance with the present invention.
Figure 2:
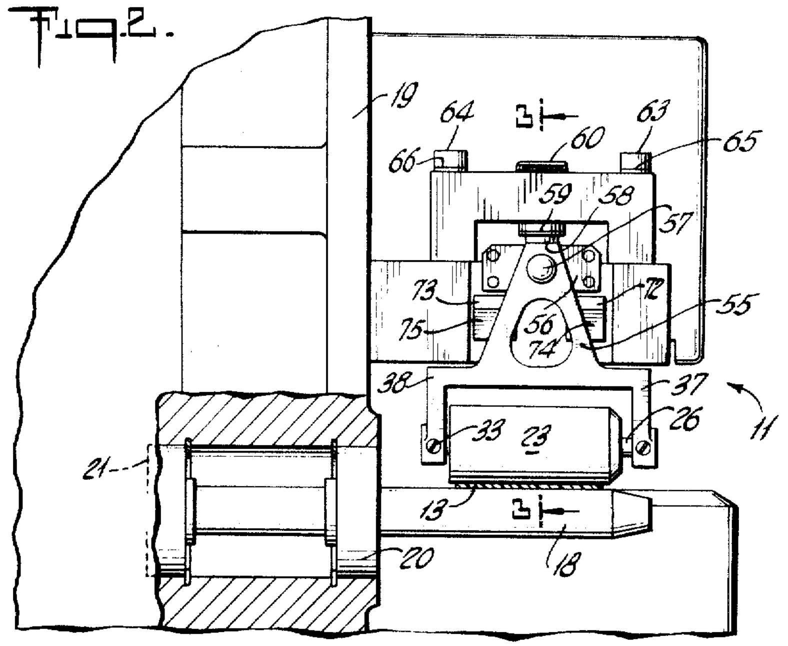
FIG. 2 is a side view partly in cross section of the tape handler apparatus shown in FIG. 1.

Referring now to FIGS. 1 and 2 of the drawings, the pinch roller drive mechanism of the invention is identified generally by the numeral 10, and the views presented in these figures show the mechanism 10 in operating relationship with a tape handler apparatus, which is identified generally by the numeral 11. While the tape handler apparatus 11 may be operative on any of several principles such as magnetic tape, it is shown in the drawings as being of the perforated tape variety of apparatus.

Whichever variety of tape handler apparatus is selected, the numeral 12 identifies generally a data processing station, and for the perforated tape variety of apparatus, information is processed on a tape 13 by a plurality of perforations in a predetermined pattern, and the information is sensed by a source of radiation such as light enclosed in a housing 14 having an opening and lens 15. The lens 15 is used to condense the light rays and focus them through the perforations in the tape 13 to a suitable detector element, such as a photoelectric cell supported within a casing 16.

While any suitable mechanism may be used to bring the tape 13 to a stop, a brake element 17 is illustrated diagrammatically for stopping the tape 13 in response to a command either external of the apparatus or a signal process directly on the tape.

A drive capstan 18 extends from the panel 19 of the tape handler apparatus 11 and is supported rotatably by bearings 20 and 21. The drive capstan 18 is rotated continuously in the direction indicated by the arrow 22 in FIG. 1 by a suitable electric motor (not shown) such as, for example, a hysteresis-synchronous A-C motor. Another drive capstan, similar to the capstan 18, is located on the right-hand side of the information processing station 12 as viewed in FIG. 1 and is rotated continuously in a direction opposite to the arrow 22, preferably by the same motor that turns the drive capstan 18. This, of course, may be accomplished by connecting a suitable belt between the shafts of the two drive capstans, if desired.

The pinch roller mechanism 10 has a roller 23 which is movable to pinch the tape 13, which tape is in the form of an elongated web, against the drive capstan 18, and since the drive capstan 18 is rotated continuously, linear motion is developed in the tape 13 in the direction of its length.

Figures 3, 4:
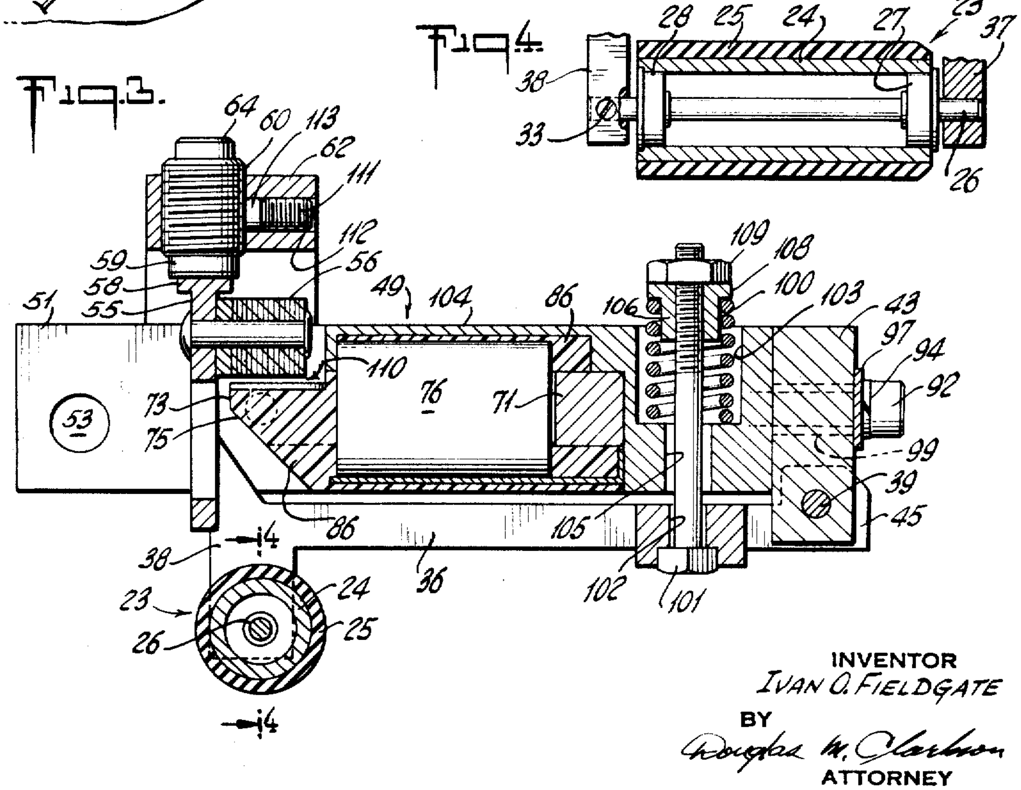
FIG. 3 is a view in cross section taken along line 3—3 of FIG. 2.
FIG. 4 is a cross sectioned view taken along line 4—4 of FIG. 3.

The roller 23 is best seen in FIG. 4 in cross section and is formed of an inner cylinder 24 of a suitable metal such as aluminum with an outer surface 25 of a composite material suitable in terms of resiliency and frictional coexistence, such as poly-urethane.

The inner cylinder 24 is supported rotatably on a shaft 26 by two bearings 27 and 28. The opposite ends of the shaft 26, as better illustrated in FIG. 7, have flattened surfaces 29 and 30 so that when they are positioned in openings 31 and 32, respectively, set screws, such as the screw 33 threaded into apertures 34 and 35, respectively, will lock the shaft 26 fixedly onto a rigid, inflexible frame 36. It will be noted that the shaft 26 is supported between extensions 37 and 38 at one end of the frame 36. The opposite end of the frame 36 is adapted to be pivoted by means of a shaft 39 inserted through an opening 40 in a projection 41, through an opening 42 in a bearing member 43, and through an opening 44 in another projection 45 (similar to the projection 41). The shaft 39 is fixed within the openings 40 and 44 by means of two set screws, similar to the set screw 46 threaded into each projection 41 and 45, respectively, to bear against the flattened surfaces 47 and 48, respectively, of the shaft 39. With the shaft 39 fixed to the frame 36, the frame 36 is pivoted by turning the shaft 39 within the opening 42 in the bearing member 43.

The pinch roller mechanism 10 is mounted on the panel 19, FIG. 2, of a tape handler apparatus 11, FIG. 1, by means of a mounting block 49. The edge 50 of the block 49 is extended passed the main body of the block to form ends 51 and 52. The end 51 has a clearance hole 53 for inserting a bolt (not shown) for threading into a panel 19 from the front as viewed in FIG. 1. The end 52 has a threaded opening 54 for receiving a bolt extending from the reverse side of the panel 19.

The frame 36 which supports the pinch roller 23 is affixed to the mounting block 49 by means of the bearing member 43.

Figure 7:
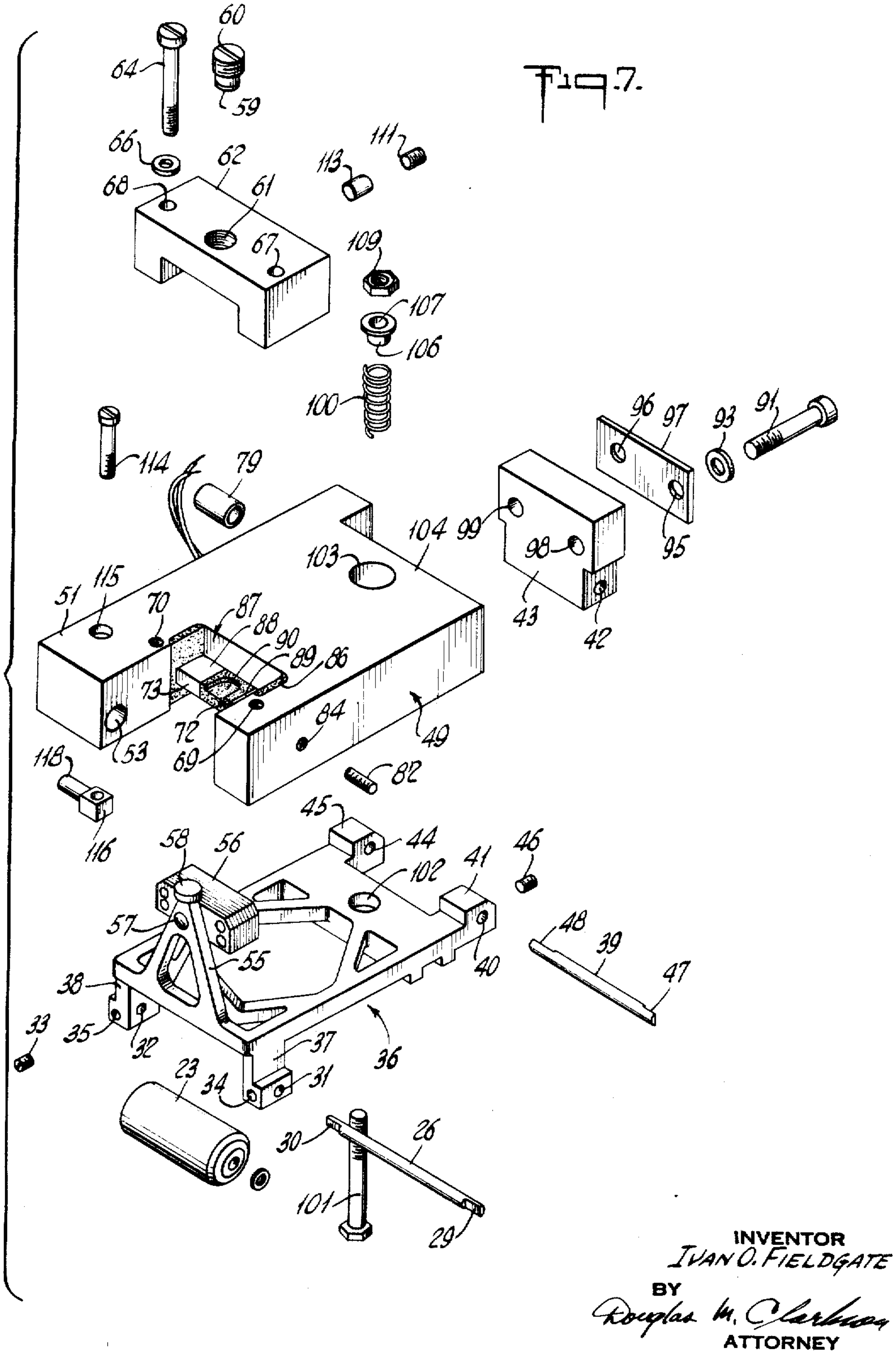
FIG. 7 is an exploded perspective view of the pinch roller mechanism in accordance with the present invention.

As best seen in FIGS. 2 and 7, an inverted V-shaped, or triangular, armature support 55 to which is fixedly attached an armature 56 by means of a suitable screw, bolt or rivet 57 extends in a direction generally perpendicular to the plane of the frame 36 and generally parallel to the plane of the projections 37 and 38. An anvil surface 58 is formed on the end of the armature support 55 on the opposite side of the armature 56 from the frame 36.

When the roller 23 is in its retracted position, the anvil surface 58 bears against a stop 59 formed on the end of a screw 60 threaded into an opening 61 in a member 62. The member 62 is affixed to the support block 49 by means of two bolts 63 and 64, FIG. 2 (with washers 65 and 66, respectively) passing through clearance holes

67 and 68, respectively, for threading into openings 69 and 70, respectively, in the support block 49.

Figure 5:
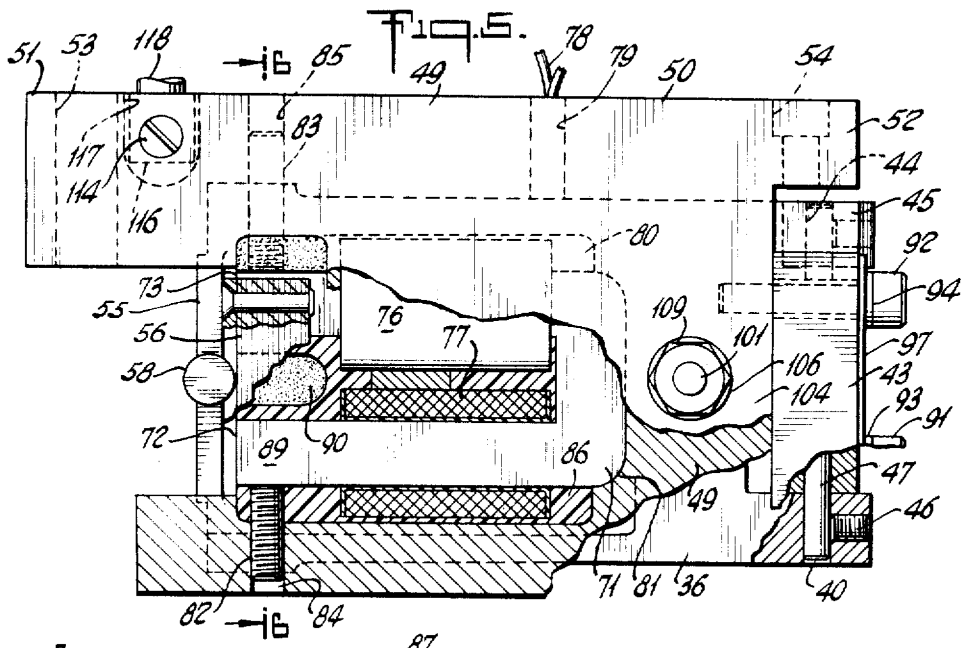
FIG. 5 is a partially sectioned top view of the pinch roller mechanism shown in FIG. 1.
Figure 6:
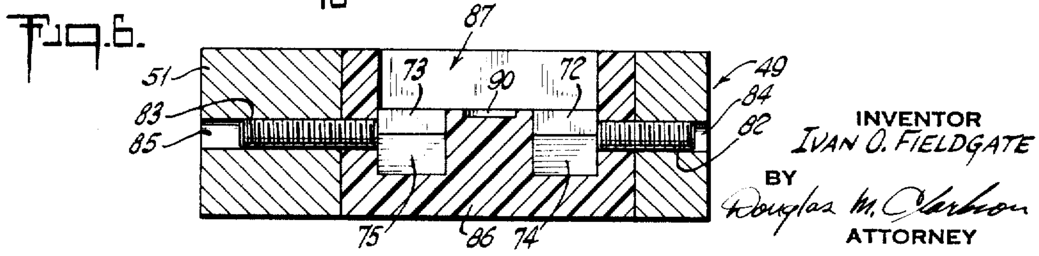
FIG. 6 is a cross sectioned view taken along line 6—6 of FIG. 5.

The underside of the support block 49 has a cavity 80, FIG. 5, in which is positioned a U-shaped magnet core 71, FIGS. 3 and 5. The ends 72 and 73 of the magnet core 71 are chamfered at 74 and 75, FIG. 2, and this is best illustrated by the cross section view in FIG. 3.

Electric windings 76 and 77 are formed about the core 71 and have leads 78 extending through an insulator sleeve 79 in the block 49.

With the windings 76 and 77 assembled on the core 71, the core 71 is inserted into a slot 81 in the cavity 80 and the pole ends 72 and 73 are supported, temporarily, in proper position by means of plastic screws 82 and 83 threaded into openings 84 and 85, respectively. With the core 71 thus held in position, the cavity 80 is filled with a suitable potting compound 86.

After the potting compound 86 is permitted to set sufficiently, a slot 87 is milled out of the potting compound 86 to expose the upper surfaces 88 and 89 of the pole ends 72 and 73. The potting compound 86 not only serves to fixedly hold the core 71 in position, but also serves to hold the various laminations of the core 71 together. It has been found that unless the potting compound is permitted to set or cure for a considerable period of time, such as several days, the material between the pole surfaces 88 and 89 will expand to form a slight rise, and therefore, prevent the armature 56 from making firm contact. Therefore, after the potting compound 86 has hardened, a groove 90 is milled out between the pole surfaces 88 and 89.

During assembly, the armature 56 is adjusted in position so that it contacts the pole surfaces 88 and 89 flatly and in substantially equal amounts area-wise by two bolts 91 and 92, FIG. 5, which pass through washers 93 and 94, respectively, through holes 95 and 96 in a stiffener plate 97, through enlarged holes 98 and 99 in the bearing support 43, and then the bolts 91 and 92 are threaded into support block 49. Because the holes 98 and 99 are enlarged as compared with the diameter of the bolts 91 and 92, the bearing support 43 may be adjusted laterally and vertically so that the frame 36 may be moved in that manner for obtaining correct positioning of the armature 56 against the pole surfaces 88 and 89. With the armature 56 positioned correctly, the bolts 91 and 92 are tightened.

The anvil surface 58 is maintained in contact against the stop 59 when the roller 23 is in its retracted position because of the action of a coil spring 100. A bolt 101 extends upwardly through an opening 102 in the frame 36 so that the head of the bolt 101 fits snugly against the underside of the frame 36, as best viewed in FIG. 3.

An enlarged opening 103 is formed in the upper surface 104 of the support block 49 to receive the coil spring 100 close to the pivot shaft 39 so that effects of spring oscillations on the roller 23 are minimized. The hole 103 is enlarged only part of the way through the thickness of the support block 49, and a smaller hole 105 extends the rest of the way through the block 49 to receive the bolt 101. In this manner, a shoulder is formed within the enlarged hole 103 against which one end of the coil spring 100 can bear.

A small sleeve 106 has an outer diameter to permit it to slide within the coil spring 100 and has an opening 107 extending axially to permit the bolt 101 to slide readily therethrough. A radially extending rim 108 is of sufficient diameter to bear against the outer end of the coil spring 100 so that when a nut 109 is threaded onto the end of bolt 101, the compression that is developed in the coil spring 100 resiliently urges the frame 36 in a clockwise direction around the shaft 93. In other words, the anvil surface 58 is placed against the stop 59 an amount dependent upon the tightness of the nut 109.

The gap 110 between the armature 56 and the pole surfaces 88 and 89 may be adjusted by turning the screw 60.

The longer the gap 110, the longer the actuating time between energization of the pinch roller mechanism 10 and engagement of the tape 13 by the roller 23, and conversely, the smaller the gap 110, the shorter the actuation time.

When an optimum setting of the gap 110 has been achieved for a particular installation, a set screw 111 threaded into an opening 112 in the member 62 presses a plug 113 tightly against the screw 60 to lock it in position.

An initial adjustment of the pinch roller mechanism 10 on the panel 19 so that the roller 23 is a desired distance above the capstan 18 is achieved by a screw 114 which passes readily through a hole 115 for receiving a nut 116 threaded on the lower end. The nut 116 is positioned in a groove 117 so that it may not turn, and the nut 116 has a prong 118 extending therefrom to fit within a matching opening in the panel 19.

Therefore, by tightening the bolt 114, the mounting block 49 is adjusted counterclockwise relative to the mounting bolt that is threaded from the reverse side of the panel 19 into the opening 54, FIG. 5. This is a limited adjustment dependent upon the amount of free space provided by the opening 53 around the bolt that mounts the block 49 to the panel 19.

The following claims are intended to define the valid scope of this invention over the prior art and to cover all changes and modifications falling within the true spirit and valid scope of the invention.

What is claimed is:

1. In a tape handler apparatus for processing information-bearing tape including:
   transducer means adapted to transfer coded information between information processing apparatus and an elongated moving web;
   a drive capstan including means to connect with a motive power source to cause rotation movement therein; and
   a pinch roller drive mechanism supported in a predetermined special relationship with the drive capstan;

said pinch roller drive mechanism comprising:
   a roller member formed of a predetermined material and including shaft means to support the roller member rotatably;
   support means to which the shaft means is connected including means to permit the support means to pivot for moving the roller member between a retracted, inoperative position and an operative position;
   mounting means for attaching the support means in said predetermined spacial relationship with said drive capstan including a bearing member in which said means to permit the support means to pivot is journaled;
   said bearing member including means to define at least one enlarged hole therethrough, and a bolt means smaller in diameter compared with the diameter of the enlarged hole for attaching the bearing member adjustably in position to the mounting means;

spring means to urge the support means into the retracted, inoperative position;
   means to actuate the roller member for moving the support means into the operative position against the action of the spring means; and
   said support means being formed of a substantially rigid and inflexible member.

2. In a tape handler apparatus for processing information-bearing tape including:
   transducer means adapted to transfer coded information between information processing apparatus and an elongated moving web;
   a drive capstan including means to connect with a motive power source to cause rotation movement therein; and
   a pinch roller drive mechanism supported in a predetermined spacial relationship with the drive capstan;

said pinch roller drive mechanism comprising:
   a roller member formed of a predetermined material and including shaft means to support the roller member rotatably;
   support means to which the shaft means is connected including means to permit the support means to pivot for moving the roller member between a retracted, inoperative position and an operative position;
   mounting means for attaching the support means in said predetermined spacial relationship with said drive capstan including a bearing member in which said means to permit the support means to pivot is journaled;
   coil spring means including a bolt extending through the mounting means, the support means and the coil spring means and a nut threaded on the bolt so that the coil spring means exerts a preselectable force for urging the roller member into the retracted, inoperative position;
   electromagnetic means for pivoting the support means against the action of the spring means to move the roller member into the operative position;
   said support means being formed of a substantially rigid and inflexible member with the pivot means at one end and the shaft means for the roller member at the opposite end; and
   said electromagnetic means including an armature supported by the support means at said opposite end from the pivot means.

References Cited

UNITED STATES PATENTS

| | | | |
|---|---|---|---|
| 642,141 | 1/1900 | Lyon | 226—180 X |
| 3,136,467 | 6/1964 | Olson | 226—177 |
| 3,147,901 | 9/1964 | Nordmann | 226—194 X |
| 3,233,807 | 2/1966 | Wray | 226—181 X |

M. HENSON WOOD, Jr., *Primary Examiner.*

J. N. ERLICH, *Assistant Examiner.*

UNITED STATES PATENT OFFICE
CERTIFICATE OF CORRECTION

Patent No. 3,353,733 November 21, 1967

Ivan O. Fieldgate

It is hereby certified that error appears in the above numbered patent requiring correction and that the said Letters Patent should read as corrected below.

Column 5, line 39, for "special" read -- spacial --.

Signed and sealed this 26th day of Novmeber 1968.

(SEAL)
Attest:

Edward M. Fletcher, Jr.
Attesting Officer

EDWARD J. BRENNER
Commissioner of Patents